US011358083B2

United States Patent
Lee et al.

(10) Patent No.: US 11,358,083 B2
(45) Date of Patent: Jun. 14, 2022

(54) METHOD OF MANUFACTURING DIESEL PARTICULATE FILTER HAVING IMPROVED COEFFICIENT OF THERMAL EXPANSION AND DIESEL PARTICULATE FILTER MANUFACTURED BY THE METHOD

(71) Applicant: CERACOMB CO., LTD., Asan-si (KR)

(72) Inventors: Kang Hong Lee, Cheonan-si (KR); Seung Ha Nam, Cheonan-si (KR); Shin Han Kim, Asan-si (KR)

(73) Assignee: CERACOMB CO., LTD., Asan-si (KR)

( * ) Notice: Subject to any disclaimer, the term of this patent is extended or adjusted under 35 U.S.C. 154(b) by 151 days.

(21) Appl. No.: 16/685,816

(22) Filed: Nov. 15, 2019

(65) Prior Publication Data

US 2020/0155987 A1    May 21, 2020

(30) Foreign Application Priority Data

Nov. 16, 2018  (KR) .................. 10-2018-0141921

(51) Int. Cl.
  *B28B 1/00*   (2006.01)
  *B01D 46/00*  (2022.01)
  *F01N 3/022*  (2006.01)
  *B28B 13/02*  (2006.01)

(52) U.S. Cl.
  CPC ............ *B01D 46/0001* (2013.01); *B28B 1/00* (2013.01); *B28B 13/02* (2013.01); *F01N 3/0222* (2013.01)

(58) Field of Classification Search
  None
  See application file for complete search history.

(56) References Cited

FOREIGN PATENT DOCUMENTS

| JP | H07242465    | * | 9/1995  | ........... C04B 35/195 |
|----|--------------|---|---------|-------------------------|
| KR | 20130114400  | * | 10/2013 | ......... B01D 39/2068  |

OTHER PUBLICATIONS

Kotani Wataru, JPH07242465 English Translation, Sep. 19, 1995 (Year: 1995).*
Cho Hang Keun, KR20130114400 English Translation, Oct. 17, 2013 (Year: 2013).*

* cited by examiner

*Primary Examiner* — Jacob T Minskey
*Assistant Examiner* — Adrien J Bernard
(74) *Attorney, Agent, or Firm* — Lex IP Meister, PLLC

(57) ABSTRACT

Disclosed are a method of manufacturing a diesel particulate filter having an improved coefficient of thermal expansion and a diesel particulate filter manufactured by the method. More particularly, the present disclosure provides a method of manufacturing a diesel particulate filter having an improved coefficient of thermal expansion, the method including: a molding step of molding a cordierite mixture; a heating step of heating a molded product manufactured by the molding step; and a firing step of firing the molded product heated in the heating step, wherein, in the heating step, the molded product manufactured by the molding step is heated up to 1410° C. and is heated at a temperature increase rate of 1° C./min or less in a temperature range of 1200 to 1280° C.

6 Claims, 1 Drawing Sheet

EXAMPLE 1

COMPARATIVE EXAMPLE 2 ate increase rate of 1° C./min or less in a tempera-
METHOD OF MANUFACTURING DIESEL PARTICULATE FILTER HAVING IMPROVED COEFFICIENT OF THERMAL EXPANSION AND DIESEL PARTICULATE FILTER MANUFACTURED BY THE METHOD

CROSS-REFERENCE TO RELATED APPLICATION

This application claims priority to and the benefit of Korean Patent Application No. 10-2018-0141921, filed Nov. 16, 2018, the contents of which is incorporated herein by reference.

BACKGROUND OF THE INVENTION

Field of the Invention

The present disclosure relates to a method of manufacturing a diesel particulate filter having an improved coefficient of thermal expansion and a diesel particulate filter manufactured by the method, and more particularly to a method of manufacturing a diesel particulate filter having an improved coefficient of thermal expansion, particularly a diesel particulate filter exhibiting a thermal expansion coefficient of $0.5 \times 10^{-6}/°$ C. or less, by controlling a temperature increase rate through a heating process and performing a firing process under a carbon dioxide or nitrogen atmosphere, and a diesel particulate filter manufactured by the method.

Description of the Related Art

Diesel particulates contained in exhaust gases of automobiles, which are carbon-based particulates, are naturally combusted because the temperature of exhaust gases is relatively high when automobile engines are driven at high RPM. On the other hand, since diesel particulates are not combusted well when automobile engines are driven at low RPM, combustion of diesel particulates is not performed well and diesel particulates are released into the atmosphere together with exhaust gases, thereby polluting the atmosphere.

To prevent such air pollution due to diesel particulates, an exhaust pipe through which exhaust gases are discharged is equipped with a diesel particulate filter made of a ceramic material, thereby preventing the emission of diesel particulates into the air.

However, since existing diesel particulate filters have high coefficients of thermal expansion, a decrease in mechanical properties, such as cracks on a filter, may occur in a process of filtering high-temperature exhaust gases for a long time.

In addition, since pores formed in existing diesel particulate filters have non-uniform sizes and distribution, there is a problem that a connection degree among pores is low.

RELATED ART DOCUMENTS

Patent Documents (Patent Document 1) Korean Patent No. 10-0747088 (Aug. 1, 2007).

(Patent Document 2) Korean Patent No. 10-1251104 (Mar. 29, 2013).

SUMMARY OF THE INVENTION

Therefore, the present invention has been made in view of the above problems, and it is one object of the present invention to provide a method of manufacturing a diesel particulate filter having an improved coefficient of thermal expansion, particularly a diesel particulate filter exhibiting a thermal expansion coefficient of $0.5 \times 10^{-6}/°$ C. or less, by controlling a temperature increase rate through a heating process and performing a firing process under a carbon dioxide or nitrogen atmosphere.

In accordance with an aspect of the present invention, the above and other objects can be accomplished by the provision of a method of manufacturing a diesel particulate filter having an improved coefficient of thermal expansion, the method including: a molding step of molding a cordierite mixture; a heating step of heating a molded product manufactured by the molding step; and a firing step of firing the molded product heated in the heating step, wherein, in the heating step, the molded product manufactured by the molding step is heated up to 1410° C. and is heated at a temperature increase rate of 1° C./min or less in a temperature range of 1200 to 1280° C.

In accordance with a preferred embodiment of the present disclosure, the heating step may be performed at a temperature increase rate of 0.25° C./min or less in a temperature range of 1200 to 1280° C.

In accordance with another preferred embodiment of the present disclosure, the cordierite mixture may be prepared by mixing 100 parts by weight of cordierite, 10 to 20 parts by weight of walnut, 1 to 2 parts by weight of graphite, 4 to 6 parts by weight of a binder, 1 to 2 parts by weight of polyvinyl alcohol, 0.1 to 1 part by weight of triethylene glycol, and 0.1 to 1 part by weight of a lubricating oil.

In accordance with still another preferred embodiment of the present disclosure, in the molding step, the cordierite mixture may be molded into a honeycomb structure.

In accordance with still another preferred embodiment of the present disclosure, in the firing step, the molded product heated in the heating step may be fired at 1410 to 1440° C. for 12 to 24 hours.

In accordance with yet another preferred embodiment of the present disclosure, in the firing step, carbon dioxide or nitrogen may be injected in an amount of 10 L/min.

In accordance with another aspect of the present invention, there is provided a diesel particulate filter having an improved coefficient of thermal expansion, manufactured by the method.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
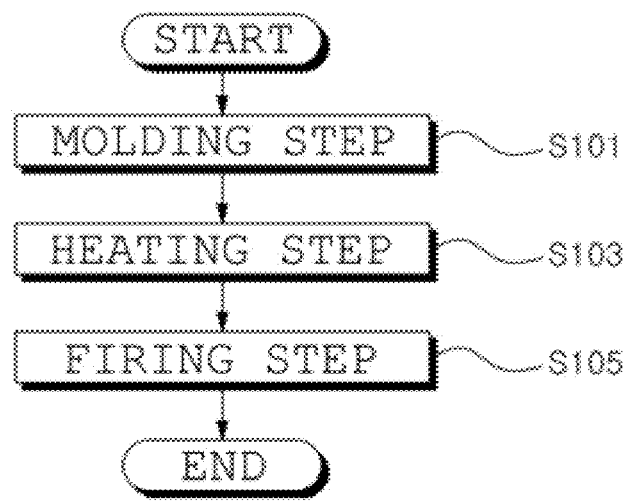
FIG. 1 illustrates a method of manufacturing a diesel particulate filter having an improved coefficient of thermal expansion according to the present disclosure.

Hereinafter, preferred embodiments of the present disclosure and the physical properties of each component are described in detail. These descriptions are provided so as for those of ordinary skill in the art to easily implement the present disclosure and should not be construed as limiting the scope and spirit of the present disclosure.

A method of manufacturing a diesel particulate filter having an improved coefficient of thermal expansion according to the present disclosure includes a molding step (S101) of molding a cordierite mixture, a heating step (S103) of heating a molded product manufactured by the molding step (S101), and a firing step (S105) of firing the molded product heated in the heating step (S103).

In the molding step (S101), a cordierite mixture is molded into a diesel particulate filter form. Here, the cordierite mixture is molded into a honeycomb structure. Although a method of molding the cordierite mixture into a honeycomb structure is not specifically limited, a compression molding method is preferred in consideration of workability.

Here, the cordierite mixture is preferably prepared by mixing 100 parts by weight of cordierite, 10 to 20 parts by weight of walnut, 1 to 2 parts by weight of graphite, 4 to 6 parts by weight of a binder, 1 to 2 parts by weight of polyvinyl alcohol, 0.1 to 1 part by weight of triethylene glycol, and 0.1 to 1 part by weight of a lubricating oil.

The cordierite is a main material of the diesel particulate filter having an improved coefficient of thermal expansion according to the present disclosure. Since such a diesel particulate filter made of cordierite has a high back pressure compared to other diesel particulate filters made of other materials, it is necessary to lower a back pressure thereof so as to realize uniform pore sizes and distribution.

In the case of general diesel particulate filters made of cordierite, pores present therein have diameters of 5 to 50 μm, and a connection degree among the pores is low, thereby having poor back pressure characteristics.

To address such a problem, it is necessary to uniformize micropores, which are formed in a molded product molded using a cordierite mixture as a law material, and macropores, which are formed by walnut and graphite as pore-forming agents, by adjusting a temperature elevation rate in the heating step.

Here, the binder may be made of one selected from the group consisting of water, alcohol, acryl, and methyl cellulose, preferably methyl cellulose.

In addition, since particle sizes of the cordierite mixture affect the density, mechanical characteristics, etc. of sintered bodies, a grinding process of grinding into a powder form is performed. Such a grinding process may be a ball milling process. Such a ball milling process is characterized by charging a mixed powder into a ball milling machine and rotating the same at a constant speed to mechanically grind the mixed powder.

Balls used for the ball milling are preferably ceramic balls made of alumina so as to suppress the generation of impurities. Here, the balls may have the same size, or balls having two or more different sizes may be used together. The mixed powder may be ground into a desired particle size by adjusting the sizes of balls, a milling time, revolutions per minute of a ball milling machine, etc. In consideration of particle sizes of a ground mixture, the sizes of balls may be preferably set to a range of 20 to 60 millimeters, and a rotational speed of a ball milling machine may be preferably set to a range of 10 to 300 rpm. In consideration of desired particle sizes, etc., ball milling may be preferably performed for 1 to 24 hours.

When a ball milling process is performed under the conditions, the cordierite mixture may be ground into fine particles and may have uniform particle distribution.

The heating step (S103) is a step of heating a molded product manufactured by the molding step (S101). When a molded product manufactured by the molding step (S101) is heated up to 1410° C., a temperature increase rate should be 1° C./min or less, preferably 0.5° C./min or less, more preferably 0.25° C./min or less, even more preferably 0.1 to 0.25° C./min, in a temperature range of 1200 to 1280° C.

When the heating step (S103) is performed under the conditions, macropores formed on a surface of the molded product become fine and are homogenized into pores having a constant range of diameters. Accordingly, when the heating step (S103) is performed under the conditions, a diesel particulate filter exhibiting a coefficient of thermal expansion of $0.4 \times 10^{-6}/°$ C. or less may be provided under a heating condition of 25 to 800° C., and a diesel particulate filter exhibiting a coefficient of thermal expansion of $0.5 \times 10^{-6}/°$ C. or less may be provided under a heating condition of 25 to 1000° C.

In addition, the heating step (S103) may be performed in any one selected from the group consisting of an electric furnace, a brick furnace and a gas furnace. Thereamong, it is preferred to use a gas furnace that allows ease of adjustment of a temperature increase rate.

The firing step (S105) is a step of firing the molded product heated in the heating step (S103). Particularly, the molded product manufactured by the heating step (S103) may be fired at 1410 to 1440° C., preferably at 1420 to 1440° C., more preferably at 1425 to 1435° C., for 12 to 24 hours, preferably 16 to 24 hours, more preferably 20 to 24 hours. Here, the firing step (S105) may be carried out under a carbon dioxide or nitrogen atmosphere, in which carbon dioxide or nitrogen is injected in an amount of 10 L/min to lower the concentration of oxygen, not in an air atmosphere.

When a diesel particulate filter is fired under a carbon dioxide or nitrogen atmosphere with low oxygen concentration, the fired diesel particulate filter exhibits a very low coefficient of thermal expansion.

By preforming all of the molding step (S101), the heating step (S103) and the firing step (S105), a diesel particulate filter with an improved coefficient of thermal expansion, which does not exhibit deteriorated mechanical properties such as cracks, even upon filtration of high-temperature exhaust gases for a long time, due to a low coefficient of thermal expansion and has uniform pore size and distribution and a high pore connection degree, may be produced.

EXAMPLES

Hereinafter, a method of manufacturing a diesel particulate filter according to the present disclosure and the properties of a diesel particulate filter manufactured by the method are described in detail with reference to examples.

Example 1

100 parts by weight of cordierite, 15 parts by weight of walnut, 1.5 parts by weight of graphite, 5 parts by weight of methyl cellulose, 1.5 parts by weight of polyvinyl alcohol, 0.6 parts by weight of triethylene glycol, and 0.6 parts by weight of a lubricating oil were mixed to prepare a cordierite mixture. The prepared cordierite mixture was fed into a compression molding machine to be molded into a molded product having a honeycomb structure. The molded product with a honeycomb structure was fed into an electric furnace, followed by heating up to 1410° C. Here, the heating was carried out at a temperature increase rate of 0.2° C./min in a temperature range of 1200 to 1280° C. The molded product was fired at 1430° C. for 24 hours while nitrogen was injected in an amount of 10 L/min into the electric furnace into which the heated molded product had been fed. As a result, a diesel particulate filter having an improved coefficient of thermal expansion (Φ10.5 inches/200 cells, thickness; 100 millimeters) was manufactured.

Comparative Example 1

An experiment was carried out in the same manner as in Example 1, except that a firing process was performed in an air atmosphere without injection of nitrogen. As a result, a diesel particulate filter (Φ10.5 inches/200 cells, thickness: 100 millimeters) was manufactured.

Comparative Example 2

An experiment was carried out in the same manner as in Example 1, except that heating was performed at a temperature increase rate of 3° C./min in a temperature range of 1200 to 1280° C. As a result, a diesel particulate filter (Φ10.5 inches/200 cells, thickness: 100 millimeters) was manufactured.

The density, porosity, water absorption rate, coefficient of thermal expansion, and softening point of the diesel particulate filter manufactured according to each of Example 1 and Comparative Examples 1 to 2 were measured. Results are summarized in Table 1 below and FIG. 2.

(Here, a density and a water absorption rate were measured using Archimedes' method, a porosity was measured using a mercury porosimeter, and a coefficient of thermal expansion and a softening point were measured using a dilatometer)

TABLE 1

| Classification | | Example 1 | Comparative Example 1 | Comparative Example 2 |
|---|---|---|---|---|
| Density (g/cm$^3$) | | 1.24 | 1.25 | 1.22 |
| Porosity (%) | | 54.19 | 52.02 | 51.88 |
| Water absorption rate (%) | | 43.67 | 42.28 | 41.55 |
| Coefficient of thermal expansion (×10$^{-6}$/° C.) | 25~800° C. | 0.31 | 0.70 | 1.10 |
| | 25~1000° C. | 0.42 | 0.82 | 1.25 |

Figure 2:
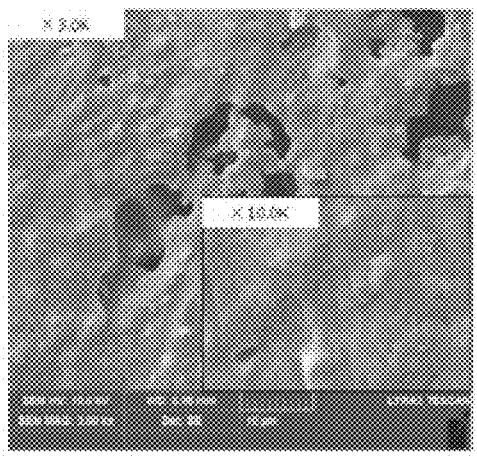
FIG. 2 illustrates photographs of diesel particulate filters, manufactured in Example 1 according to the present invention and Comparative Example 2, taken by a scanning electron microscope (SEM).
Figure 2:
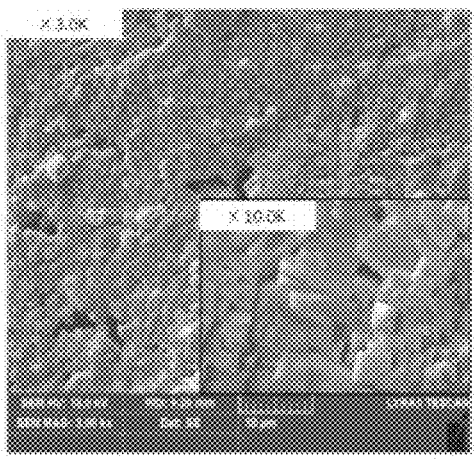

As shown in Table 1 and FIG. 2, it was confirmed that the diesel particulate filter manufactured according to Example 1 of the present disclosure exhibited a significantly low coefficient of thermal expansion, compared to the diesel particulate filters manufactured according to Comparative Example 1 to 2.

In particular, it was confirmed that the diesel particulate filter manufactured according to Example 1 exhibited a coefficient of thermal expansion of $0.31 \times 10^{-6}$/° C. under a heating condition of 25 to 800° C. and a coefficient of thermal expansion of $0.42 \times 10^{-6}$/° C. under a heating condition of 25 to 1000° C.

In addition, it was confirmed that a porosity and a water absorption rate were independent of an oxygen concentration at the time of firing.

In addition, surfaces of the diesel particulate filters manufactured according to Example 1 and Comparative Example 2 were taken by SEM and illustrated in the accompanying FIG. 2.

As shown in FIG. 2, microstructures formed in the diesel particulate filters manufactured according to Example 1 and Comparative Example 2 were taken by SEM. As results, it was confirmed that the cordierite structure synthesized inside the diesel particulate filter was changed according to a temperature elevation condition of the heating process, and cordierite crystals of the diesel particulate filter of Example 1 heated at a temperature increase rate of 0.2° C./min in a temperature range of 1200 to 1280° C. were much more clearly formed, compared to the diesel particulate filter manufactured according to Comparative Example 2.

Therefore, the present invention provides a method of manufacturing a diesel particulate filter having an improved coefficient of thermal expansion, more particularly a method of manufacturing a diesel particulate filter having an excellent thermal expansion coefficient, particularly a diesel particulate filter exhibiting a thermal expansion coefficient of $0.5 \times 10^{-6}$/° C. or less in temperature ranges of 25 to 800° C. and 30 to 1000° C., by controlling a temperature increase rate through a heating process and performing a firing process under a carbon dioxide or nitrogen atmosphere.

A diesel particulate filter having the above thermal expansion coefficient exhibits uniform pore sizes and distribution and a high pore connection degree, without a decrease in mechanical properties, such as cracks, even upon filtration of high-temperature exhaust gases for a long time due to the low thermal expansion coefficient.

As apparent from the above description, the present invention provides a method of manufacturing a diesel particulate filter having an improved coefficient of thermal expansion, more particularly a method of manufacturing a diesel particulate filter having an excellent thermal expansion coefficient, particularly a diesel particulate filter exhibiting a thermal expansion coefficient of $0.5 \times 10^{-6}$/° C. or less, by controlling a temperature increase rate through a heating process and performing a firing process under a carbon dioxide or nitrogen atmosphere.

In addition, the present invention provides a diesel particulate filter having a low thermal expansion coefficient, and, accordingly, exhibiting uniform pore sizes and distribution and a high pore connection degree, without a decrease in mechanical properties, such as cracks, even upon filtration of high-temperature exhaust gases for a long time.

DESCRIPTION OF REFERENCE NUMBERS

S101: molding step
S103: heating step
S105: firing step

What is claimed is:
1. A method of manufacturing a diesel particulate filter having an improved coefficient of thermal expansion, the method comprising:
a molding step of molding a cordierite mixture;
a heating step of heating a molded product manufactured by the molding step; and
a firing step of firing the molded product heated in the heating step,
wherein,
in the heating step, the molded product manufactured by the molding step is heated up to 1410° C. and is heated at a temperature increase rate of 25° C./min or less in a temperature range of 1200 to 1280° C.,
the cordierite mixture is prepared by mixing 100 parts by weight of cordierite, 10 to 20 parts by weight of walnut, 1 to 2 parts by weight of graphite, 4 to 6 parts by weight of a binder, 1 to 2 parts by weight of polyvinyl alcohol, 0.1 to 1 part by weight of triethylene glycol, and 0.1 to 1 part by weight of a lubricating oil,
in the firing step, the molded product heated in the heating step is fired at 1410 to 1440° C. for 12 to 24 hours, and the diesel particulate filter manufactured by the method exhibits a coefficient of thermal expansion of 0.31/10-6° C. or less under a heating condition of 25 to 800° C. and a coefficient of thermal expansion of 0.42/10-6° C. or less under a heating condition of 25 to 1000° C.

2. The method according to claim 1, wherein, in the molding step, the cordierite mixture is molded into a honeycomb structure.

3. The method according to claim 1, wherein, in the firing step, carbon dioxide or nitrogen is injected in an amount of 10 L/min.

4. A diesel particulate filter having an improved coefficient of thermal expansion, manufactured by the method according to claim 1.

5. A diesel particulate filter having an improved coefficient of thermal expansion, manufactured by the method according to claim 2.

6. A diesel particulate filter having an improved coefficient of thermal expansion, manufactured by the method according to claim 3.

* * * * *